United States Patent

[11] 3,617,189

| [72] | Inventors | George M. Wagner<br>Lewiston;<br>William J. Vullo, North Towanda, both of<br>N.Y. |
|---|---|---|
| [21] | Appl. No. | 846,283 |
| [22] | Filed | July 30, 1969 |
| [23] | | Division of Ser. No. 510,083,<br>Nov. 26, 1965, abandoned |
| [45] | Patented | Nov. 2, 1971 |
| [73] | Assignee | Hooker Chemical Corporation<br>Niagara Falls, N.Y. |

[54] COMPOSITION AND PROCESS FOR TREATING CELLULOSIC MATERIALS
5 Claims, No Drawings

[52] U.S. Cl. .................................................. 8/116.2,
8/DIG. 11, 106/2, 117/143 R, 117/144, 117/147,
117/154, 252/8.6, 260/9 R
[51] Int. Cl. .................................................. D06m 13/42
[50] Field of Search .................................................. 8/115.6,
116.2; 117/143 R, 143, 161, 135.5; 260/453 A, 2.5
AT, 75 T, 75 TN, 77.5 AT, 75; 252/8.6; 106/2

[56] References Cited
UNITED STATES PATENTS

| 3,112,984 | 12/1963 | Aldridge .................... | 8/116.2 X |
| 3,294,713 | 12/1966 | Hudson et al. ................ | 260/77.5 X |
| 3,462,295 | 8/1969 | Elmquist et al. .............. | 117/143 |

OTHER REFERENCES

Bennett, Practical Emulsions, Pub. 1943 by Chemical Pub. Co. Inc., Brooklyn, N.Y. pages 12 and 24.

Somers, Progress With New Polymers, British Rayon and Silk Journal, Nov., 1953, pages 62 and 63.

Marsh, An Introduction to Textile Finishing, Pub. 1948, pages 477 to 479.

Saunders et al., Polyurethanes: Chemistry and Technology, II Technology, pages 458, 463, 622– 625, 736– 750.

Primary Examiner—Herbert B. Guynn
Assistant Examiner—Arnold I. Rady
Attorneys—Peter F. Casella, Donald C. Studley, Richard P. Mueller and James F. Mudd ABSTRACT: A composition useful in treating cellulosic materials to make them durably water repellent which comprises an aqueous emulsion of a soap, a surface active agent, water and a polyaryl polyisocyanate containing at least three aryl groups and an average of at least three isocyanate groups, a portion of which isocyanate groups may be modified by reaction with an alcohol, thioalcohol, organic acid, amine or amide. This composition is applied to the cellulosic material and is, thereafter, cured with water.

COMPOSITION AND PROCESS FOR TREATING CELLULOSIC MATERIALS

This case is a division of Ser. No. 510,083, filed Nov. 26, 1965, now abandoned.

This invention relates to an improved composition and process for treating cellulosic materials and more particularly, it relates to an improved composition and process for treating cellulosic materials so as to render them highly water repellent.

In the past, considerable time and effort has been expended in the development of compositions and processes for treating cellulosic materials so as to render them water repellent. Although many compositions and processes for this purpose have been developed and used, for the most part none of these have been completely durable to repeated launderings and/or dry cleanings. Accordingly, cellulosic textile materials which have been treated with the prior art composition to render them water repellent frequently lose this water repellency and must be retreated to restore it after several dry cleanings or washings. Additionally, insofar as the cellulosic textiles are concerned, problems have sometimes been encountered in that the prior art water-repellent compositions have adversely altered the hand of the fabric, making them hard and/or stiff and boardy. Moreover, and particularly with regard to the treatment of paper, the cost of the prior art water repellency compositions and processes has frequently been sufficiently great as to discourage their wide spread acceptance and use.

It is, therefore, an object of the present invention to provide a novel treated cellulosic material which is substantially permanently water repellent.

A further object of the present invention is to provide an improved process for treating cellulosic materials so as to render them substantially permanently water repellent, which process is easily and economically carried out.

These and other objects of the present invention will become apparent to those skilled in the art from the description which follows.

Pursuant to the above objects, the present invention includes a process for treating a cellulosic material which comprises contacting the cellulosic material with a polymerizable treating solution comprising a polyaryl polyisocyanate containing at least three aryl groups and an average of at least three isocyanate groups, a portion of which isocyanate groups may be modified by reaction with an alcohol, thioalcohol, organic acid, amine or amide, and thereafter, curing the thus-contacted material with water. The cellulosic materials, including cellulosic textiles and paper, treated in accordance with this process are found to be durably water repellent, even after repeated dry cleaning or washing in hot water. Additionally, the hand or feel of the thus-treated cellulosic textile materials is generally found to be substantially unchanged from that of an untreated material.

More specifically, in the practice of the present invention, the cellulosic material to be treated include cellulosic textile materials, such as cotton, ramie, rayon, jute, and nontextile materials such as paper, cardboard, wood, and the like. These cellulosic materials may be in various forms, including yard or sheet goods, as well as various finished articles, such as articles of clothing, including coats, shirts, trousers, skirts, and the like, and such nontextile articles as paper containers, bags, wallboard and the like. Of the numerous cellulosic materials with which these articles may be made, the process of the present invention has been found to be particularly applicable in the treatment of cotton and paper. Accordingly, hereinafter, primary reference will be made to cotton and paper as being the preferred cellulosic materials. This is not, however, to be taken as a limitation on the present invention as other cellulosic materials may also be advantageously treated by the present process. Additionally, the process of the present invention is not limited to the treatment of cotton, paper or other cellulosic materials in the form of yard or sheet goods or finished articles, but may, in many instances, also be utilized in treating these materials in the fiber, yarn, or pulp form.

In treating the cellulosic material so as to make them durably water-repellent, the material is impregnated with a solution which comprises, as the essential water repellent component, a polyaryl polyisocyanate compound, either as such or modified by reaction with an alcohol, thioalcohol, organic acid, amine or amide. Suitable compounds may be characterized generally as being selected from the group consisting of

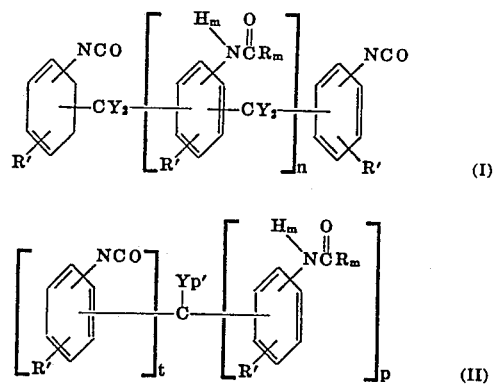

and wherein $n$ is a number having an average value of at least 1 and is generally from 1 to 4; $t$ is a number from 2 to 4; $p$ is a number from 0 to 2; $p'$ is 0 or 1; $t+p$ has an average value of at least 3 and is generally from 3 to 4; $t+p+p'$ is 4; $m$ is a number from 0 to 1; $R'$ is selected from the group consisting of halogen, hydrogen, alkyl and alkoxy; $y$ is selected from the group consisting of hydrogen, alkyl and phenyl; R is selected from the group consisting of OX, SX, X,

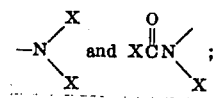

and X is selected from the group consisting of hydrogen, alkyl, alkylphenol, alkylphenoxyalkoxy and phenyl.

Desirably in the compounds used, as characterized by the above generic formulas, the alkyl groups, either as such or in an alkylphenoxy or alkoxy group contain from about one to 20 carbon atoms and preferably from about four to 20 carbon atoms. Additionally, the term "halogen," as used in the formula, is intended to include chlorine, fluorine, bromine and iodine. Exemplary of specific compounds falling within the generic formulas given hereinabove are the following:

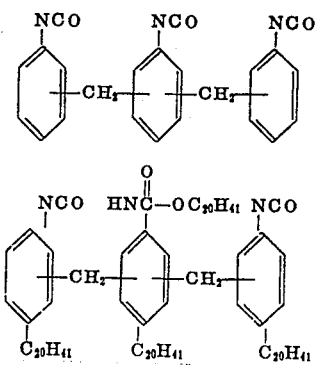

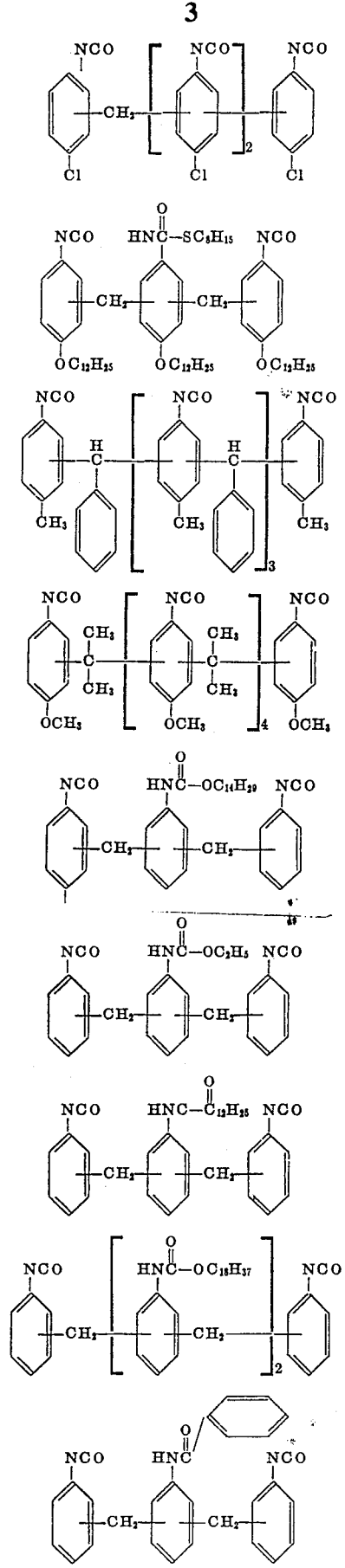
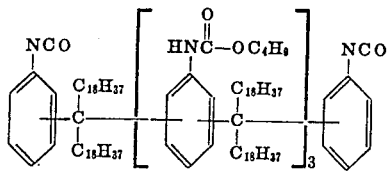
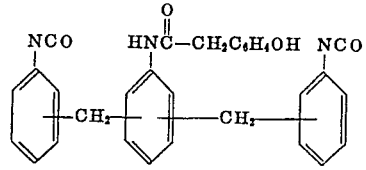
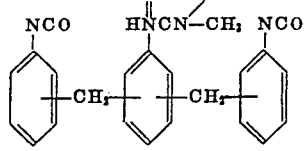
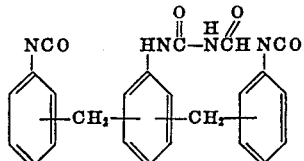
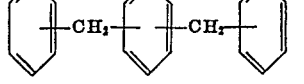
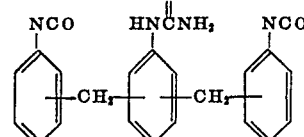
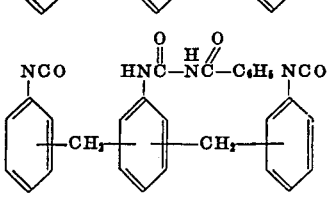
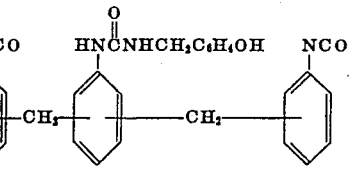
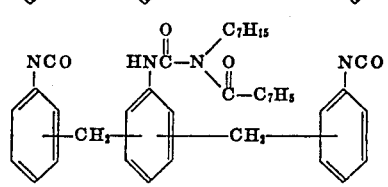
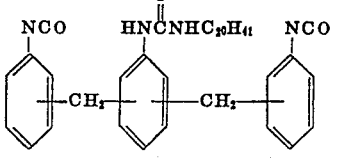
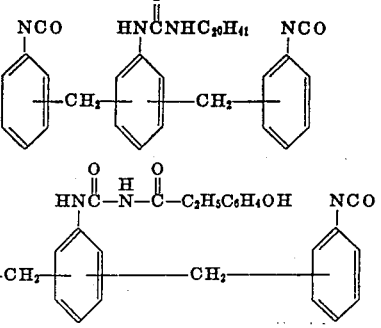
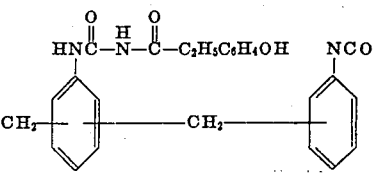

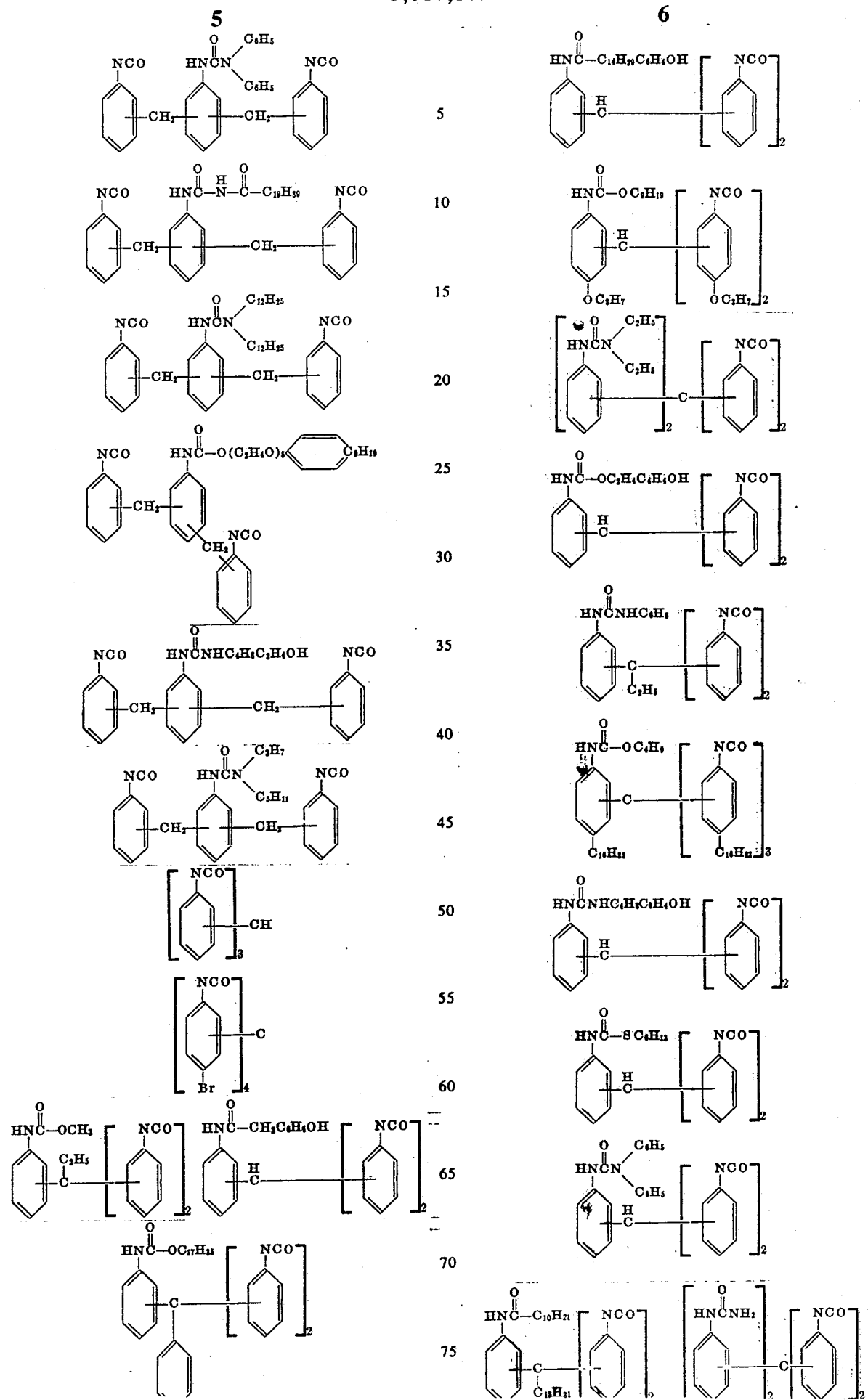

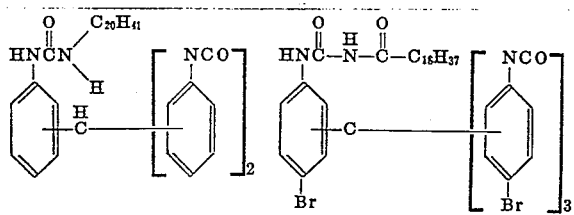
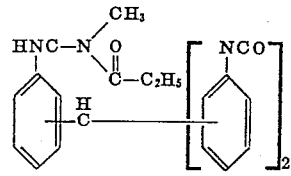
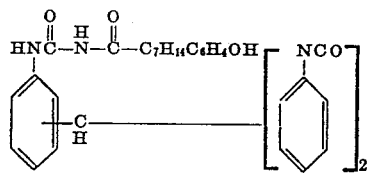
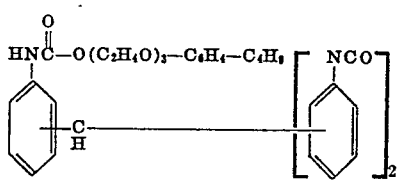
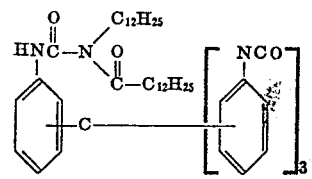
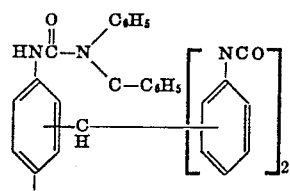
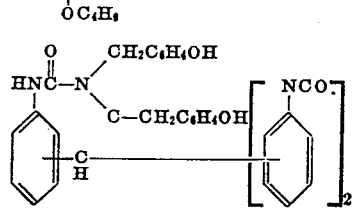
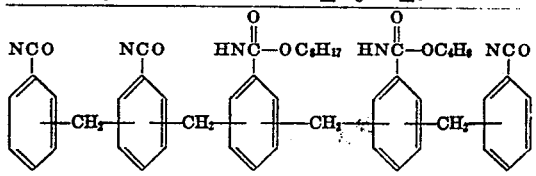
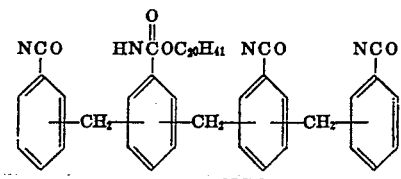
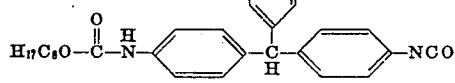

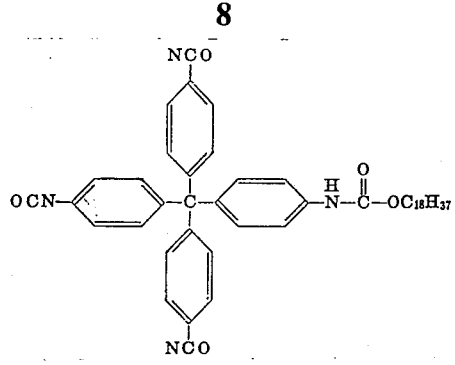

It is to appreciated that similar compounds, other than those which have been specifically set forth hereinabove, may be utilized as water repellent agents in the process of the present invention. Additionally, the water repellent compositions used may be a mixture of one or more of the above compounds or other similar compounds which fall within the generic formulas which have been given. Often, such mixtures will be the natural result of the preparation of the compositions, which preparations may give a statistical distribution of the possible products. Such mixtures may be mixtures of various polymethylene polyphenyl isocyanates, mixtures of various poly(isocyanatophenyl)methanes, or mixtures of both polymethylene polyphenyl isocyanates and poly(isocyanatophenyl)methanes.

In preparing the impregnating solutions for use in the method of the present invention, the water repellent component as has been described is dispersed or dissolved in a suitable solvent. Although any solvent, in which the isocyanate material will dissolve without decomposition may be used, in many instances, the aromatic organic solvents, such as benzene, toluene, xylene, and the like, are preferred. Additionally, halogenated aliphatic solvents, such as trichloroethylene, perchloroethylene, carbon tetrachloride, methylene chloride, and the like, have also been found to be extremely useful. The solvents may be classified generally as benzene, substituted benzenes containing 1-3 lower alkyl groups of one-six carbon atoms each and halogenated lower alkyls containing one-six carbon atoms and 1-8 halogens. The water repellent component is dispersed or dissolved in the solvent in an amount sufficient to provide the desired resin add-on on the cellulosic material when the material is impregnated with the solution. Concentrations within the range of about 0.5 to about 50 % by weight of the solvent composition are typical, but in many instances, higher concentrations are also suitable, up to the maximum solubility of the isocyanate material in the solvent used. Typical of such higher concentrations which may be used are those of 80 to 90% by weight of the solvent composition, or even higher, in those instances where the isocyanate material used is miscible in substantially all proportions with the solvent.

In preparing the impregnating solution for use in the present method, when using an unmodified polyisocyanate, such as polymethylene polyphenylisocyanate or tris(isocyanatophenyl)methane, the polyisocyanate material is dissolved in the solvent in an amount sufficient to provide the desired concentration in the impregnating solution. Where a modified polyisocyanate material is used, the unmodified polyisocyanate may be dissolved in several times its own weight of solvent and to this mixture the modifying material, such as an alcohol, thioalcohol, organic acid, amine, or amide is added, in an amount sufficient to react with the unmodified polyisocyanate and effect the modification desired. Additionally, if desired, the reaction mixture may also contain a suitable catalyst, such as a polyalkyl amine. Typically, the amount of modifying agent added is sufficient to react with from about 5% to about 70% of the isocyanate groups present, and preferably is sufficient to react with from about 10% to 35% of the isocyanate groups. The amount of modifier used is such that in the resulting modified isocyanate there are at least two unmodified isocyanate groups.

Once the reaction is substantially complete, additional solvent may be added to the reaction mixture to obtain the impregnating solution having the desired concentration. Alternatively, of course, the modified polyisocyanates may be prepared separately and thereafter dissolved in the solvent in appropriate amounts to form the impregnating solution, as is done with the unmodified polyisocyanate.

Additionally, it is to be appreciated that the water repellent compositions of the present invention may be applied as an emulsion, rather than as a solution. In such instances, the polyisocyanate as such or modified as has been indicated above is mixed with a suitable emulsifying agent and dispersed in water. These emulsion systems like the solutions may contain from about 0.5 to 50% by weight of the polyisocyanate material, with the higher concentrations also being usable. For many applications, however, emulsion systems having a solids content of from about 1–15% by weight are preferred. Suitable emulsifying agents which may be used are anionics such as the alkyl and alkyl aryl sulfonates and sulfates and nonionics, such as the alkylene ethers. Typically, the anionics will contain from about four to about 30 carbon atoms in the alkyl portion and from six–ten carbon atoms in the aryl portion. The nonionics will typically contain from about four to about 30 carbon atoms and from about 1 to 15 moles of alkylene oxide. In many instances, it has been found to be desirable to include a fatty acid soap in the emulsion. Such soaps typically contain from about eight to about 26 carbon atoms and are exemplified by the alkali metal stearates, palmitates and the like. The term alkali metal is intended to include sodium, potassium, lithium, cesium and rubidium.

A typical emulsion containing 10% solids for use in the present method will contain the following components in the amounts indicated:

| Components | Parts by Weight |
| --- | --- |
| Polyisocyanate composition (as a 35% solution in toluene) | 2.85–28.5 |
| Soap | 0.3–3 |
| Surface active agent | 0.2–1.0 |
| Water | balance to make 100 |

If desired, this emulsion may be further diluted with water, emulsions having a solids content as low as 0.1% having been found to be useful. It is to be noted that in this emulsion, it is desirable that the surface active agent is present in the minimum amount needed to hold the emulsion. In this manner, the rewetting effect of the surface active agent is minimized. Additionally, the presence of the step is found to aid in forming and holding the emulsion and also in reducing the rewetting effect.

The cellulosic materials, such as a cotton textile material or paper, may be impregnated with the polymerizable solution or emulsion prepared as indicated hereinabove, using any convenient means. For example, the cotton may be immersed or padded in the treating solution or emulsion and the fabric then passed through squeeze rolls to remove excess solution. If desired, as with paper, the treating emulsion or solution may be applied to the paper by spraying, rather than by immersion. Other suitable application techniques, as are known to those in the art, may also be used. After the cellulosic materials have been impregnated with the emulsion or solution, they are preferably dried so as to remove the solvent from the material. Desirably, the impregnation is carried out so that the treated cellulosic material has a resin add-on within the range of about 1 to about 15% by weight of the material. Higher resin add-on than 15%, e.g., 40 to 50%, may be attained in some instances although, generally, it has not been found that such higher add-ons appreciably improve the water repellency which is obtained. Generally, it has been found that resin add-ons appreciably less than 15%, e.g., 0.05 to 5% are often sufficient to provide durable water repellency of the cellulosic materials. Typically, the treating solution or emulsion is maintained at a temperature within the range of about 10° C. to the boiling point of the solvent used, e.g., 120° C. for perchloroethylene, and preferably is within the range of about 20° C. to about 30° C. during the impregnation step. Thereafter, the impregnated material is dried, preferably in an oven, at a temperature within the range of about 20° C. to the boiling point of the solvent used, with temperatures within the range of about 65° C. to about 125° C. being preferred.

Following the impregnation and drying of the cellulosic material, the thus-treated material is then cured in water. Although various techniques may be utilized in effecting this cure, where the treated material is a cellulosic textile, the material is preferably immersed in water and maintained in the water until the curing is complete.

It has been found that the time to effect the desired cure of the polyisocyanate material with which the cellulosic textile is impregnated varies with the temperature at which the cure is effected. Accordingly, it is desirable that the water used is at an elevated temperature, temperatures within the range of about 40° C. to about 100° C. being typical, with temperatures within the range of about 80° C. to about 94° C. being preferred. When carrying out the water cure at these temperatures, curing times within the range of about 1 hour to about 1 minute are typical, with times of 30 minutes to 2 minutes being preferred. It is to be appreciated, that where the length of curing time is not an important factor, the water cure of the polyisocyanate impregnant may be carried out at room temperature, i.e., about 20° C. Under such conditions, the curing time may be as long as several days, e.g., 48 hours. There is, however, some indication that the full water repellency effectiveness of the polyisocyanate compositions may not be attained when the water cure is carried out under these low temperature conditions. Moreover, it has been found that low temperature curing techniques, and particularly those carried out below about 75° C., may not impart to the treated fabric the desired degree of durability to dry cleaning solvents, such as trichloroethylene. In many instances, after curing under these conditions, dry cleaning of the fabric may remove appreciable quantities of the cured water repellent material. Accordingly, low temperature curing techniques are generally not preferred for cellulosic textiles.

It is to be further appreciated, that if desired, the water cure of the polyisocyanate impregnant in either a textile or nontextile material may be effected by substantially saturating the impregnated cellulosic material with water and thereafter, completing the polymerization or cure of the polyisocyanate by heating the water-wet, substantially saturated material at an elevated temperature. In such processes, curing temperatures within the range of about 66° C. to about 177° C. for periods of about 30 minutes to about 1 minute are typical, with temperatures within the range of about 107° to about 135° C. for periods of 10 minutes to about 3 minutes being preferred. After the water cure of the impregnated material has been completed, the material is then dried to remove any water which may remain. Frequently, when using water impregnation of the treated material, followed by heating at an elevated temperature, the curing and drying of the impregnated material is effected substantially simultaneously.

It has further been found that in some instances water in vapor form may be used to effect the cure of the impregnated cellulosic material. Such water may be as steam, water vapor or the like, including water vapor in the atmosphere. The use of water in this form has been found to be of value in curing impregnated paper. In such a process, the paper which has been impregnated with the treating solution or emulsion is then brought into contact with water vapor, as for example in an area of relatively high humidity and cured either with or without the application of heat. In many instances, it has been found sufficient if the paper is cured at room temperature in the atmosphere. Such a curing technique is satisfactory for paper or other cellulosic materials which, during use, will not be subjected to repeated washings and/or dry cleanings and which, normally, will not be reused numerous times. In such materials, any reduction in durability of the impregnant due to the way the water cure is carried out will not be of great consequence.

It has been found that in many instances the water used to carry out the polymerization or cure of the polyisocyanate impregnant in the textile material is desirably slightly alkaline. Typical pH values for the curing water are within the range of about 7.5 to 9. Where the pH of the curing water is below these values, it may be adjusted by adding thereto an alkaline material, such as an alkali metal bicarbonate. Additionally, if desired, the curing water may also contain small amounts of a suitable wetting agent, to insure more thorough and rapid wetting of the impregnated material. Typical wetting agents which may be used are nonionics, such as the polyalkylene ethers and anionics such as alkyl aryl sulfonates and sulfates. These materials are typically present in amounts within the range up to about 1% by weight of the treating water, amounts within the range of about 0.05 to about 0.2% being preferred.

As has been indicated hereinabove, the process of the present invention may be carried out on cellulosic materials in various forms, including yard or sheet goods, finished articles, such as coats and the like, as well as on pulp, the unspun fiber or the yarn itself. It has been found that cellulosic materials, such as cotton and paper, which have been treated in accordance with this process consistently show excellent water repellency, and the wet strength and burst strength of treated paper is also good. Moreover, it has been found that the water repellency is retained by the treated fabrics even after numerous washings in hot water and that the hand and feel of the treated materials are not substantially different from those of untreated material. Additionally, the water repellent finish is durable to dry cleaning and is found to impart dimensional stability to the fabric. It also facilitates dyeing and improves dye fastness.

In order that those skilled in the art may better understand the present invention and the manner in which it may be practiced, the following specific examples are given. It is to be understood that these examples are illustrative of the invention and are not intended to be limitations thereon. In these examples, unless otherwise indicated, temperatures are in degrees centigrade and parts and percentages are by weight. Additionally, in these examples, one or more of the following tests are used to evaluate the treated materials:

1. Spray test
   Federal Specification ccc-T-1916-A No. 5526 or American Association of Textile Chemists and Colorists —No. 22-1964
   250 milliliters of water are sprayed downwardly, though a standard nozzle, on the sample which is held at a 45° angle to the horizontal. The degree of wetting is compared to standard photographs. 100 is excellent —no wetting and 0 is complete absorbency.
2. Hydrostatic Test
   Federal Specification ccc-T-1916 – No. 5512.2
   The amount of water, in grams, is measured which penetrate the sample in 10 minutes at a hydrostatic head of 8 inches.
3. Impact Penetration Test
   Federal Specification ccc-T-1916-No. 5522
   The amount of water, in grams, is measured which penetrates the sample when 500 milliliters of water are sprayed on the sample from a length of 2 feet.
4. Water Absorbency Test
   American Association of Textile Chemist and Colorists 21-1964
   The weight percent of water which is absorbed by the sample during a 24 hour immersion in water is measured.
5. Methanol/Water Test
   The specimen is contacted for 15 seconds with various methanol-water solutions containing from 0 to 100% by volume methanol. Specimen is given a rating corresponding to the methanol content of the solution which just doesn't wet the surface of the specimen. 0 is the lowest rating —no water repellency and 100 is the highest.
6. Bag test
   The fabric is shaped to form a bag and water, to a depth of 4 inches, is added. Leakage during 24 hours is noted. If no leakage occurs, fabric is rated as passing. If there is leakage, fabric is noted as failing.
7. Tensile Strength Test
   Carried out on a Scott Tensile Tester using a jaw opening of 3 inches, a rate of travel of 12 inches per minute and measured in the machine direction. Results are in pounds/inch of width of the specimen.
8. Burst test
   Carried out on a Mullin Burst Tester using Technical Association of Pulp and Paper Institute Test T-403m.-53. Results are in pounds/square inch.

Additionally, in the wet Gurley stiffness, wet tensile strength and wet burst strength tests, the properties were determined after the specimen had been immersed in water for 24 hours.

EXAMPLE 1

A treating solution was prepared by dissolving a commercial polymethylene polyphenylisocyanate, having a viscosity of 250 centipoises at 25° C. and an NCO equivalent weight of 133.5, in benzene to form a solvent solution containing about 3 percent by weight of the polyisocyanate. 79 pound kraft paper was impregnated with the solution to a wet pick-up of 55%. The paper was then air-dried, immersed in water for 10 minutes and then heated at 120° C. until dry to effect simultaneous curing and drying. The resin add-on on the paper was 1.9%. One portion of the thus-treated paper was placed in boiling water for 24 hours and this portion and a treated but unboiled portion were tested for impact penetration, and wet and dry tensile strength. The following results were obtained:

|  | Unboiled | Boiled |
| --- | --- | --- |
| Impact penetration(grams) | 0 | 0 |
| Dry tensile strength(pounds per inch of width) | 63 | 59 |
| Wet tensile strength (% of Dry) | 31 | 25 |

In contrast, an untreated control disintegrated almost immediately in the boiling water.

EXAMPLE 2

The procedure of example 1 was repeated but using a trichloroethylene solution of the polyisocyanate at varying concentrations. The treated paper samples and an untreated control were then tested to determine the extent of water repellency and the following results were obtained:

|  | A | B | C | D |
| --- | --- | --- | --- | --- |
| Solution concentrations—(%) | 1.0 | 0.5 | 0.1 | Untreated |
| Wet pickup | 95 | 95 | 95 | |
| Spray rating | 50 | 45 | 50 | 0 |
| Hydrostatic test (grams) | 0 | 0 | 0 | Sample failed |
| Impact penetration (grams) | 0 | 0 | 0 | Sample failed |
| Water absorption—(%) | 39 | 41 | 48 | 120 |
| Dry tensile strength—(pounds per inch of width) | 70 | 67 | 67 | 62 |
| Wet tensile strength (% of Dry) | 22 | 20 | 16 | 8 |
| Dry burst strength(pounds per square inch) | 68 | 72 | 64 | 60 |
| Wet burst strength (% of Dry) | 41 | 31 | 30 | 14 |

EXAMPLE 3

A polyisocyanate treating solution was formed as in example 1. This solution, at various concentrations, was padded onto 8.5 ounce sateen cotton to obtain a wet pickup of about 65%. The fabric was air dried and then cured by immersion in water at 50° C. for 10 minutes. Thereafter, the treated fabrics were tested to determine the effectiveness of the water repellency and the following results were obtained:

|  | A | B | C |
| --- | --- | --- | --- |

| | | | |
|---|---|---|---|
| Solution concentration (%) | 10 | 7.5 | 5.0 |
| Resin add-on (%) | 8.8 | 6.7 | 2.6 |
| Spray rating | 60 | 60 | 70 |
| Impact penetration test (grams) | 0 | 0 | 0 |
| Hydrostatic test (grams) | 0 | 0 | 0 |

After 9 boil cycles, the fabrics were retested and the results obtained were as follows:

| | A | B | C |
|---|---|---|---|
| Spray rating | 50 | 60 | 50 |
| Impact penetration test (grams) | 0 | 0 | 0 |
| Hydrostatic test (grams) | 0 | 0 | 0 |

EXAMPLE 4

A treating composition was prepared by dissolving 50 parts of the polymethylene polyphenylisocyanate, as used in example 1, in 100 parts of toluene. To this solution were added 20 parts of 1-octadecanol, and 0.5 parts of triethylamine catalyst. The resulting solution was stirred for a period of about 30 minutes while the temperature was maintained below about 40° C. At the end of this time, it was found that all of the alcohol had reacted with the isocyanate to form an alcohol substituted polyisocyanate containing 0.2 moles of alcohol per mole equivalent of NCO group. A series of dilute treating solutions were prepared and applied to 80 pound kraft paper as in example 1. The treated paper samples were then cured as in example 1, dried and tested to determine the effectiveness of the water repellency treatment. The results of these tests were as follows:

30 parts by weight of the alcohol were used. The resulting alcohol substituted polyisocyanates formed contained 0.05, 0.10, 0.15 and 0.30 moles of alcohol per mole equivalent of NCO. Treating solutions were formed as in example 4 and kraft paper samples were treated to obtain varying resin add-ons. After curing and drying, these samples were included in the tests of the samples of example 4 and the following results were obtained:

| Polyisocyanate modifier, moles of alcohol: | Percent add-on | Impact test | Spray rating | Hydro-static | Water absorption, percent | Burst dry | Burst wet, percent of dry | Tensile strength, dry | Tensile strength wet, percent of dry |
|---|---|---|---|---|---|---|---|---|---|
| 0.05 | 1.0 | 0 | 95 | 0 | 41 | 68 | 31 | 62 | 19 |
| 0.05 | 0.5 | 0 | 75 | 0 | 41 | 63 | 29 | 60 | 17 |
| 0.05 | 0.1 | 0 | 60 | 0 | 46 | 68 | 20 | 62 | 13 |
| 0.10 | 1.0 | 0 | 95 | 0 | 42 | 67 | 27 | 57 | 19 |
| 0.10 | 0.5 | 0 | 95 | 0 | 41 | 64 | 25 | 62 | 15 |
| 0.10 | 0.1 | 0 | 60 | 0 | 44 | 61 | 23 | 54 | 14 |
| 0.15 | 1.0 | 0 | 100 | 0 | 40 | 68 | 27 | 57 | 19 |
| 0.15 | 0.5 | 0 | 95 | 0 | 40 | 68 | 25 | 66 | 14 |
| 0.15 | 0.1 | 0 | 75 | 0 | 44 | 71 | 20 | 60 | 13 |
| 0.30 | 1.0 | 0 | 100 | 0 | 33 | 58 | 43 | 56 | 22 |
| 0.30 | 0.5 | 0 | 90 | 0 | 36 | 59 | 28 | 68 | 20 |
| 0.30 | 0.1 | 0 | 60 | 0 | 41 | 59 | 21 | 66 | 14 |

EXAMPLE 6

The procedure of example 4 was repeated using 1-butanol, 1-octanol, 1-dodecanol and tetradecanol as the modifying alcohols, in amounts of 5.46, 9.6, 13.7 and 15.8 parts by weight, respectively. The resulting modified polyisocyanates all contained about 0.2 moles of alcohol per mole equivalent of NCO. After treating kraft paper with solutions of these products, as in example 4, the samples were cured in air 24 hours at room temperature and then tested for water repellency and the following results were obtained:

| Product | Percent solids in treating solution | Methanol-water test | Spray rating | Water absorption, percent | Hydro-static test |
|---|---|---|---|---|---|
| $C_4H_9OH$ | 2.4 | 50 | 75–80 | 36 | 0 |
| $C_8H_{17}OH$ | 2.6 | 60 | 80 | 35 | 0 |
| $C_{12}H_{25}OH$ | 2.7 | 80 | 90 | 37 | 0 |
| $C_{14}H_{29}OH$ | 2.8 | 80 | 90 | 38 | 0 |

| Add-on, percent | 0.1 | 0.5 | 0.1 | 2.0 | 3.0 | 4.0 | 5.0 | 10 | 30 | 30 | 35 | Untreated |
|---|---|---|---|---|---|---|---|---|---|---|---|---|
| Water resistance: | | | | | | | | | | | | |
| Spray rating | 60 | 65 | 90 | 95 | 95 | 95 | 95 | 95 | 100 | 100 | 100 | 0 |
| Hydrostatic (grams) | 0 | 0 | 0 | 0 | 0 | 0 | 0 | 09 | 0 | 0 | 0 | Fail |
| Impact penetration (grams) | 0 | 0 | 0 | 0 | 0 | 0 | 0 | 0 | 0 | 0 | 0 | Fail |
| Water absorption, percent | 59 | 54 | 52 | 48 | 47 | 49 | 54 | 54 | 52 | 49 | 41 | 115 |
| Methanol/water | 60 | 70 | 70 | 80 | 70 | 80 | 80 | 80 | 80 | 70 | 70 | 0 |
| Tensile strength (pounds per inch of width): | | | | | | | | | | | | |
| Dry | 59 | 57 | 63 | 63 | 63 | 63 | 68 | 73 | 74 | 72 | 67 | 62 |
| Wet, percent of dry | 15 | 24 | 22 | 21 | 24 | 22 | 22 | 22 | 26 | 28 | 29 | 8 |
| Bursting strength (pounds per square inch): | | | | | | | | | | | | |
| Dry | 74 | 64 | 71 | 61 | 66 | 64 | 77 | 75 | 72 | 73 | 79 | 60 |
| Wet, percent of dry | 21 | 29 | 35 | 39 | 41 | 39 | 37 | 41 | 44 | 45 | 48 | 4 |
| Stiffness, Gurley (milligrams): | | | | | | | | | | | | |
| Dry | 1,354 | 1,350 | 1,420 | 1,490 | 1,755 | 1,710 | 1,755 | 1,600 | 1,690 | 1,930 | 1,800 | 1,510 |
| Wet, percent of dry | 27 | 27 | 21 | 21 | 23 | 23 | 23 | 26 | 26 | 26 | 29 | 23 |

EXAMPLE 5

Additional treating solutions were formulated, using the procedure of example 4 with the exception that 5, 10, 15 and

EXAMPLE 7

The procedure of example 4 is repeated with treating solutions prepared by using the modifiers and polyisocyanates in the amounts shown in the following table. In each instance, the reaction temperatures and catalyst amounts are varied as necessary to obtain the indicated reaction products. In all cases, the treated paper is comparable to that obtained and tested in example 4. It is to be noted that in section II of the table, the polyisocyanate used is a 20% by weight solution of the isocyanate:

| Section I | Modifier | Amount of modifier (parts) | Polyisocyanate | Amount of polyisocyanate (parts) | Mols of modifier per mole equiv. of NCO |
|---|---|---|---|---|---|
| A | 1-hexanethiol | 8.7 | Polymethylene-polyphenyl isocyanate. | 50 | 0.2 |
| B | 1-decanoic acid | 19 | do | 50 | 0.3 |
| C | Benzoic acid | 4.5 | do | 50 | 0.1 |
| D | Heptyl amine | 8.5 | do | 50 | 0.2 |
| E | Dodecyl amine | 55 | do | 50 | 0.5 |
| F | 4-(4-hydroxyphenyl) butyl amine | 12 | do | 50 | 0.2 |
| G | Formamide | 12 | do | 50 | 0.7 |
| H | Benzamide | 13.4 | do | 50 | 0.3 |
| I | N-heptylheptamide | 17.8 | do | 50 | 0.2 |

| Section II | Modifier | Amount of modifier (parts) | Polyisocyanate | Amount of polyisocyanate (parts) | Mols of modifier per mole equiv. of NCO |
|---|---|---|---|---|---|
| J | 1-eicosanol | 30 | Tris(isocyanato-phenyl)methane | 185 | 1 |
| K | p-Hydroxyphenyl-ethanol | 14 | do | 920 | 0.2 |
| L | 1-pentanethiol | 11 | do | 368 | 0.5 |
| M | p-Hydroxyphenyl-tetradecanoic acid | 7 | do | 19 | 2 |
| N | Diphenyl amine | 2 | do | 184 | 0.1 |
| O | Eicosanyl amine | 3 | do | 46 | 0.4 |
| P | N-phenyl benzamide | 2 | do | 28 | 0.67 |
| Q | N-decyl dodecamide | 3.5 | do | 37 | 0.5 |

EXAMPLE 8

An octadecanol modified polyisocyanate was prepared as in example 4. An emulsion of this product was prepared by combining the following components in the amounts indicated:

| Components | Parts |
|---|---|
| Octadecanol modified polyisocyanate (as a 35% solution in toluene) | 57.0 |
| Sodium stearate | 1.0 |
| Sodium lauryl sulfate | 0.4 |
| Water | 142.0 |

This emulsion contained about 10% solids. This emulsion was applied to kraft paper as in example 4 and the cured and dried samples were tested for water repellency as in that example. The results of these tests were as follows:

| | | |
|---|---|---|
| Add-On % | 0.1 | 1.0 |
| Water Resistance | | |
| Spray Rating | 60 | 60 |
| Hydrostatic | 0 | 0 |
| Impact Pen. | 0 | 0 |
| Water Absorp. | 70.3% | 66% |
| Methanol/Water | 20 | 60 |
| Tensile Strength | | |
| Dry | 61 | 62.5 |
| Wet, % Dry | 11.6% | 16% |
| Burst Strength | | |
| Dry | 71 | 73 |
| Wet, % of Dry | 18.3% | 23.3% |
| Stiffness, Gurley | | |
| Dry | 1090 | 1890 |
| Wet, % of Dry | 26.4% | 17.8% |

EXAMPLE 9

A treating composition was prepared as in example 4. This composition was formed into a treating solution in trichloroethylene containing 4.0% of the modified polyisocyanate. Samples of cotton cloth were passed through this solution and then dried in air. One portion of the treated cloth was cured by immersion in water for 15 minutes at 50° C. and the other portion was cured by immersion in water to saturate the cloth and then heated in an oven for 5 minutes at 121° C. The resin add-ons obtained were 5.1 and 6.0% respectively. Thereafter the samples were tested for water repellency and compared to an untreated control sample. The following results were obtained:

| Product | Impact | Spray | Bag Test |
|---|---|---|---|
| Hot H₂O cured | 24.6 | 80 | pass |
| H₂O + oven heat cured | 20.8 | 85 | pass |
| Untreated | 40.0 | 0 | fail |

While there have been described various embodiments of the invention, the compositions and methods described are not intended to be understood as limiting the scope of the invention, as changes therewithin are possible and it is intended that each element recited in any of the following claims is to be understood as referring to all equivalent elements for accomplishing substantially the same results in substantially the same or equivalent manner, it being intended to cover the invention broadly in whatever form its principle may be utilized.

A composition useful in treating cellulosic materials to render such materials durably water repellent, which composition consists essentially of an emulsion formed of:
a. water
b. from about 0.3 to about 3 percent by weight of an alkali metal soap of a fatty acid containing about eight to about 26 carbon atoms
c. from about 0.2 to about 1.0% by weight of an emulsifying agent selected from the group consisting of anionic alkyl and alkyl aryl sulfonates and sulfates containing from about four to about 30 carbon atoms in the alkyl portion and from about six to about 10 carbon atoms in the aryl portion, and
d. from about 0.5 to about 50 percent by weight of a polyaryl polyisocyanate selected from the group consisting of (I) 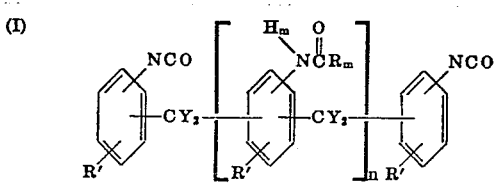

and (II) 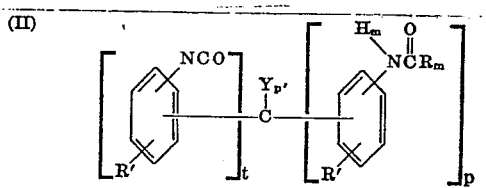

wherein $n$ is a number having an average value of at least 1 and is generally from 1 to 4; $t$ is a number from 2 to 4; $p$ is a number from 0 to 2; $p'$ is a number from 0 to 1; $t+p$ has an average value of at least 3 and generally is from 3 to 4; $t+p+p'$ is 4; $m$ is a number from 0 to 1; $R'$ is selected from the group consisting of halogen, hydrogen, alkyl containing from one to about 20 carbon atoms and alkoxy containing from one to about 20 carbon atoms; Y is selected from the group consisting of hydrogen, phenyl and alkyl containing from one to about 20 carbon atoms; R is selected from the group consisting of

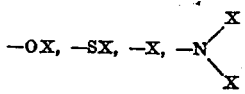

and

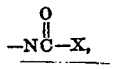

and X is selected from the group consisting of hydrogen, phenyl, alkyl containing from one to about 20 carbon atoms, alkylphenol wherein the alkyl portion contains from one to about 20 carbon atoms, and alkylphenoxyalkoxy wherein the alkylphenoxy and alkoxy groups each contain from one to about 20 carbon atoms.

2. The composition as claimed in claim 1 wherein the emulsion contains the soap in an amount of about 0.5 to 0.005%, the emulsifying agent in an amount of about 0.2 to 0.002% and the polyisocyanate in an amount of about 10 to 0.1%

3. A composition as claimed in claim 1 wherein the alkali metal soap is sodium stearate.

4. A composition as claimed in claim 1 wherein the emulsifying agent is sodium lauryl sulfate.

5. A composition as claimed in claim 1 wherein the composition has a solids content of from about 0.1 to 15 percent by weight.

* * * * *

UNITED STATES PATENT OFFICE
CERTIFICATE OF CORRECTION

Patent No. 3,617,189             Dated November 2, 1971

Inventor(s) George M. Wagner, etal.

It is certified that error appears in the above-identified patent and that said Letters Patent are hereby corrected as shown below:

Column 4, line 17:

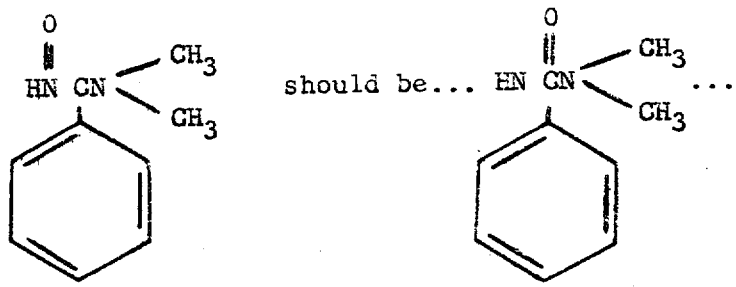

Column 13, line 49:

"30 30" should be...20 30...

Column 13, line 51:

under "10", "09" should be...0...

Column 13, line 59:

under "untreated", "4" should be...14...

Signed and sealed this 23rd day of May 1972.

(SEAL)
Attest:

EDWARD M.FLETCHER, JR.
Attesting Officer

ROBERT GOTTSCHALK
Commissioner of Patents